Patented June 27, 1950

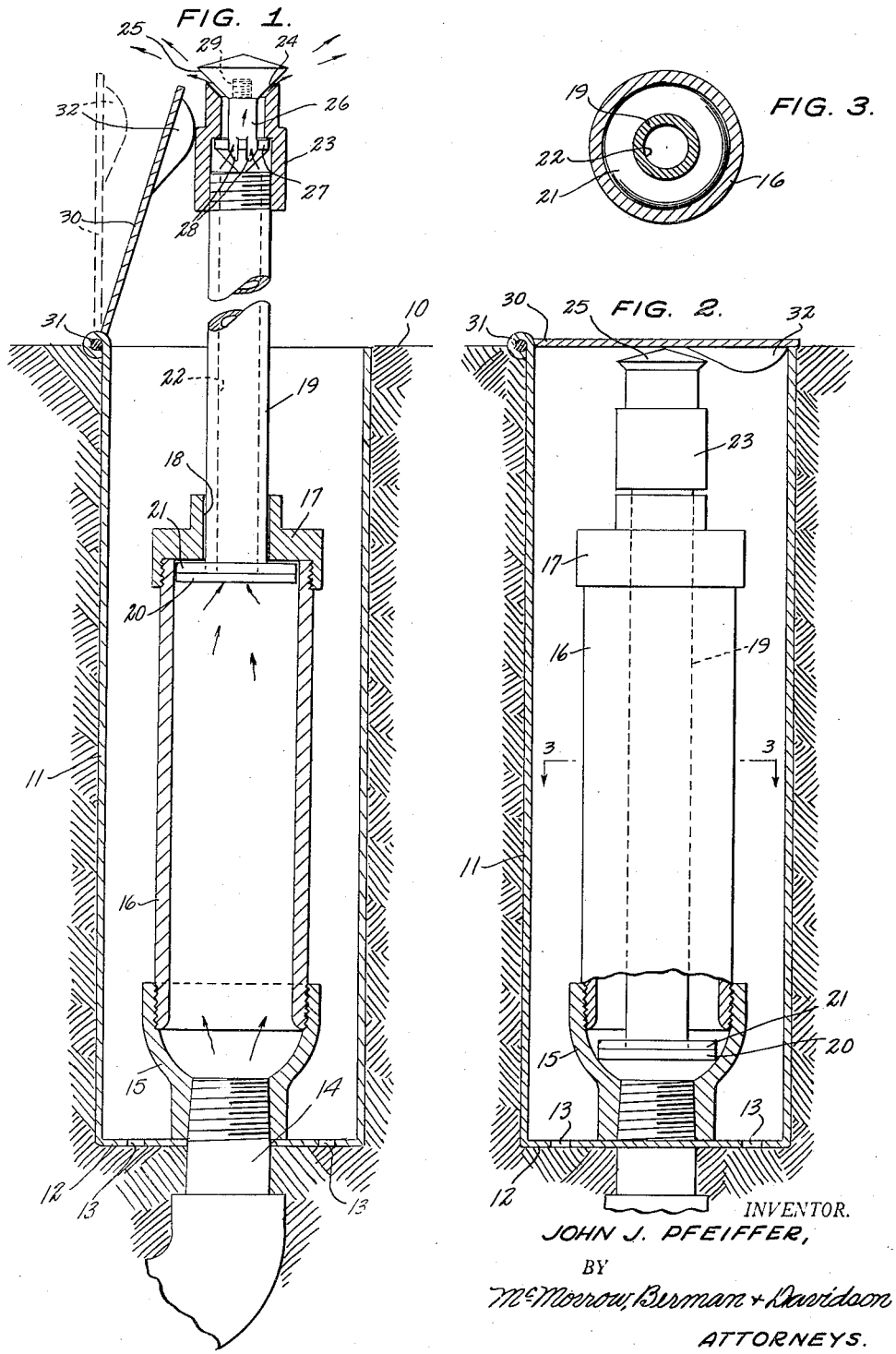

2,513,047

UNITED STATES PATENT OFFICE 2,513,047

DISAPPEARING LAWN SPRINKLER

John J. Pfeiffer, Montebello, Calif.

Application May 28, 1948, Serial No. 29,702

2 Claims. (Cl. 299—61)

My invention relates to lawn sprinklers, and more particularly to such type of lawn sprinklers as are adapted to be normally located below the ground level, but which include portions projectible above the ground level under the influence of water pressure, such portions including a sprinkler head for dispensing fluid under pressure over the lawn.

With the foregoing in view, it is an object of the invention to provide an improved lawn sprinkler of the type described.

A further object is to provide an improved lawn sprinkler which includes a buried casing surrounding the same with the upper edge of said casing substantially flush with the ground level, a cover for the casing and sprinkler hinged to said upper edges of the casing, and said cover being automatically opened and closed upon the projection and retraction, respectively, of the sprinkler-providing portion above and below the ground level.

Other objects and advantages reside in the particular structure of the invention, combination and arrangement of the several parts thereof, and will be readily understood by those skilled in the art upon reference to the attached drawing, in connection with the following specification, wherein the invention is shown, described and claimed.

In the drawing:

Figure 1 is a longitudinal vertical sectional view showing the device in an operative position, parts being broken away and parts being shown in side elevation;

Figure 2 is a view similar to Figure 1, but showing the parts in the retracted or inoperative position;

Figure 3 is a horizontal sectional view taken substantially on the plane of the line 3—3 of Figure 2.

Referring specifically to the drawing, wherein like reference characters have been used throughout the several views to designate like parts, 10 designates the ground level of a lawn or like area desired to be watered by the sprinkler according to the invention. A substantially cylindrical casing 11 is buried in the lawn so that the upper edges thereof are substantially flush with the ground level 10. The casing 11 may have a floor 12 formed with drain apertures 13 therein to permit the escape of water accidentally accumulating in the casing 11. The floor 12 is axially apertured for the insertion therethrough of the discharge end 14 of any suitable pipe line or conduit for supplying water under pressure to the device. Any suitable union 15 is secured to the end of the pipe 14, whereby to lock the casing 11 in position and to provide a fluid-tight connection with a hydraulic cylinder 16 which extends vertically of the casing axially thereof. The upper end of the cylinder 16 is enclosed by a cylinder head 17 which is axially apertured, as at 18, for the sliding passage therethrough of the tubular piston rod 19 of a piston 20. The upper surface of the piston 20 is provided with any suitable gasket 21 which is engageable with the undersurface of the cylinder head 19 to provide a seal when the piston is raised under water pressure to the Figure 1 position. Thus, water in the cylinder 16 is prevented from leaking around the piston rod 19 through the aperture 18 into the casing 11 to a great extent. The piston rod 19 is provided with an axially-disposed channel 22 which opens into the interior of the cylinder 16. The upper end of the piston rod 19 has secured thereto an adapter 23, the upper edges of which are provided with an outwardly-beveled valve seat 24 for the valve head 25. The valve head 25 includes a valve stem 26 extending axially downwardly in the adapter 23. The lower end of the stem 26 is provided with a radially outwardly-directed flange 27, the marginal edges of which are notched, as at 28, to permit the passage of water therethrough. The flange 27 engages an annular shoulder or protuberance formed interiorly of the adapter 23 to prevent removal of the valve 25 and the associated parts from the adapter 23. The valve 25 and stem 26 may be detachably secured together in any suitable manner, as by the threaded connection 29, to permit removal and replacement of the parts.

It follows from the foregoing that when water is supplied to the interior of the cylinder 16 by any suitable valve means, not shown, the fluid pressure will raise the piston 20 together with the piston rod 19 from the retracted Figure 2 position, wherein the valve 25 is below the ground level 10, to the Figure 1 position, wherein the valve 25 is projected above the ground level. Likewise, water under pressure will flow from the cylinder 16 through the channel 22 in the piston rod 19 and through the notches 28 in the valve stem flange 27. Thereafter, the fluid pressure will raise the valve 25 slightly above the seat 24, whereby the fluid is dispensed radially outwardly and upwardly in all directions from the valve 25. Thus, the valve 25 and the associated parts just described comprise a sprinkler head for the piston rod 19.

The upper edge of the casing 11 has hingedly connected thereto by any suitable hinge-providing means 31, a cover 30 which normally lies flush with the ground level 10 and spans the casing upper edges to close the same. However, the water pressure aforesaid is sufficiently great to raise the cover 30 from the Figure 2 to the Figure 1 position, permitting passage of the sprinkler head to the projected position. Likewise, the cover 30 at some point substantially opposite to the hinges 31 is provided with a counterweight 32 on the under surface thereof which loads the cover 30 for movement to the closed position of Figure 2. Likewise, it should be noted that as the piston rod and sprinkler head are raised, the cover 30 is not entirely open, but leans against the sprinkler head and/or the piston rod 19 so that it is automatically closable by gravity upon retraction of the sprinkler head below the ground level 10. This movement is enhanced by the longitudinally curved counterweight 32, of course. However, the cover 30 may be moved to the broken line position, Figure 1, when it is desired to be maintained permanently open for the inspection and/or repair of parts. The curved inner surface of the counterweight 32 will bear against the outer surface of the adapter 23 and rod 19 to keep the upper edge of the cover 30 from being caught under the lower edge of the adapter for stopping or interfering with the retraction of the sprinkler head.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

What is claimed is:

1. In a disappearing lawn sprinkler, a vertically disposed casing having its lower end closed and its upper end open positioned below a ground surface with the open end facing upwardly, a union positioned within said casing and having one end resting upon the closed lower end of the latter, means on said one end of said union for securement thereto of an end of a conduit containing a source of water under pressure, a hydraulic cylinder positioned within said casing and having one end fixedly secured to the other end of said union, a piston positioned in said cylinder and mounted therein for up and down movement, a piston rod loosely extending through the other end of said cylinder and having one end fixedly secured to said piston, a hollow adapter having one end secured to the other end of said piston rod, a valve head positioned exteriorly of the other end of said adapter and mounted for movement into and out of seating engagement with said other end of said adapter, a valve stem positioned within said adapter and having one end fixedly secured to said valve head, a flange depending from the other end of said valve stem and engageable with a protuberance formed on the inner wall of said adapter for limiting the movement of said valve head away from seating engagement with said other end of said adapter, and a cover mounted on the open end of said casing for movement into and out of closing engagement with respect to said open end, said cover being movable out of closing engagement upon execution of the up movement of said piston.

2. In a disappearing lawn sprinkler a vertically disposed casing having its lower end closed and its upper end open positioned below a ground surface with the open end facing upwardly, a union positioned within said casing and having one end resting upon the closed lower end of the latter, means on said one end of said union for securement thereto of an end of a conduit containing a source of water under pressure, a hydraulic cylinder positioned within said casing and having one end fixedly secured to the other end of said union, a piston positioned in said cylinder and mounted therein for up and down movement, a piston rod loosely extending through the other end of said cylinder and having one end fixedly secured to said piston, a hollow adapter having one end secured to the other end of said piston rod, a valve head positioned exteriorly of the other end of said adapter and mounted for movement into and out of seating engagement with said other end of said adapter, a valve stem positioned within said adapter and having one end fixedly secured to said valve head, a flange depending from the other end of said valve stem and engageable with a protuberance formed on the inner wall of said adapter for limiting the movement of said valve head away from seating engagement with said other end of said adapter, said flange having its marginal edges notched to thereby provide openings for the passage of water therearound, and a cover mounted on the open end of said casing for movement into and out of closing engagement with respect to said open end, said cover being movable out of closing engagement upon execution of the up movement of said piston.

JOHN J. PFEIFFER.

REFERENCES CITED

The following references are of record in the file of this patent:

UNITED STATES PATENTS

| Number | Name | Date |
| --- | --- | --- |
| 865,008 | Brenzinger | Sept. 3, 1907 |
| 1,058,549 | Cathcart | Apr. 8, 1913 |
| 1,251,306 | Volkhardt | Dec. 25, 1917 |
| 1,259,902 | Parker | Mar. 19, 1918 |
| 1,428,553 | Oakes | Sept. 12, 1922 |
| 1,919,196 | Brooks | July 25, 1933 |
| 1,938,511 | Brady | Dec. 5, 1933 |
| 2,125,863 | Arbogast | Aug. 9, 1938 |
| 2,325,280 | Scherrer | July 27, 1943 |